(12) United States Patent
Coskrey, IV et al.

(10) Patent No.: US 6,487,622 B1
(45) Date of Patent: Nov. 26, 2002

(54) QUORUM ARBITRATOR FOR A HIGH AVAILABILITY SYSTEM

(75) Inventors: Ernest C. Coskrey, IV, Columbia, SC (US); Vernon K. Boland, Lexington, SC (US); Harold B. Raynor, Columbia, SC (US); Steven R. McDowell, Lexington, SC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/429,355

(22) Filed: Oct. 28, 1999

(51) Int. Cl.$^7$ .............................................. G06F 12/00
(52) U.S. Cl. ........................ 710/241; 710/240; 710/242
(58) Field of Search .................... 710/240, 241, 710/242, 243, 244, 309, 107, 108, 109, 111, 112, 113, 114, 115, 116

(56) References Cited

U.S. PATENT DOCUMENTS

| | | | |
|---|---|---|---|
| 4,719,569 A | * 1/1988 | Ludemann et al. | 710/241 |
| 4,809,168 A | 2/1989 | Hennessy et al. | 364/200 |
| 5,003,464 A | * 3/1991 | Ely et al. | 710/263 |
| 5,167,022 A | * 11/1992 | Bahr et al. | 710/108 |
| 5,301,283 A | * 4/1994 | Thacker et al. | 710/116 |
| 5,490,270 A | 2/1996 | Devarakonda et al. | 395/600 |
| 5,548,780 A | 8/1996 | Krein | 395/825 |
| 5,555,378 A | 9/1996 | Gelman et al. | 395/200.13 |
| 5,596,754 A | 1/1997 | Lomet | 395/726 |
| 5,634,060 A | * 5/1997 | Jennings | 710/241 |
| 5,673,384 A | 9/1997 | Hepner et al. | 395/182.09 |
| 5,805,785 A | 9/1998 | Dias et al. | 395/182.02 |
| 5,828,889 A | 10/1998 | Moiin et al. | 395/728 |

* cited by examiner

*Primary Examiner*—Peter Wong
*Assistant Examiner*—Tim Vo
(74) *Attorney, Agent, or Firm*—Maginot, Addison & Moore (57) ABSTRACT

A computer system operable to provide nodes of a cluster with a quorum resource includes a network interface controller, a mass storage device, a processor, and memory. The network interface controller is operable to send messages to the nodes via a network and receive messages from the nodes via the network. The mass storage device includes storage that is used to implement the quorum resource and that is accessible by the nodes via the network interface controller. The processor is operably coupled to the network interface controller and the mass storage device. The memory is operably coupled to the processor and includes instructions, which when executed by the processor, cause the processor to process a first message requesting ownership of the quorum resource that is received from a first node of the cluster via the network interface controller. Furthermore, the instructions cause the processor to determine whether the first node already owns the quorum resource in response to receiving the first message. Moreover, the instructions cause the processor to determine whether a second message requesting ownership of the quorum resource is received from a second node of the cluster within a predetermined time period of receiving the first message it the first node does not already own the quorum resource. The instructions cause the processor to grant ownership of the quorum resource to the first node if the second message is not received within the predetermined time period.

18 Claims, 7 Drawing Sheets

CLUSTER NODE A: QUORUM OWNER RECEIVES JOIN REQUEST FROM NODE B

FIG. 7
QUORUM ARBITRATOR

QUORUM ARBITRATOR FOR A HIGH AVAILABILITY SYSTEM

BACKGROUND OF THE INVENTION

Some clustering products such as Microsoft's Cluster Server (MSCS) utilize a quorum resource in order to maintain data integrity and cluster unity among the nodes of a cluster. In such products, the quorum resource provides physical storage that is accessible by every node of a cluster and persistent arbitration between the nodes of the clusters. In other words, the quorum resource provides a mechanism which grants ownership of the quorum resource to a single node of the cluster and defends the granted ownership from requests to gain ownership of the quorum resource from other nodes of the cluster.

The MSCS Clustering Service alludes to the fact that third party vendors may develop different types of quorum resources. However, the only quorum resource defined by MSCS Clustering Service and used by current MSCS Clustering Services is the shared SCSI storage device. In particular, current MSCS environments include a shared SCSI storage device which provides physical storage that is accessible by every node of the cluster and which utilizes the Reserve and Release commands of the SCSI protocol in order to maintain persistent arbitration. While shared SCSI storage devices satisfy the requirements of a quorum resource, shared SCSI storage device have some drawbacks. One drawback of shared SCSI storage devices is that shared SCSI storage devices require the nodes of the cluster to be in relative close proximity of the shared SCSI storage device due to the cabling requirements of the SCSI protocol. Another drawback of shared SCSI storage devices is that shared SCSI storage devices are rather expensive in today's marketplace (e.g. $10,000). This relatively high expense associated shared SCSI storage devices precludes clustering as a realistic solution in environments that would otherwise gain great benefit from clustering.

Accordingly, a need exists for a method and apparatus which provide a cluster of nodes with a more cost effective implementation of a quorum resource than current shared SCSI storage device implementations.

SUMMARY OF THE INVENTION

The present invention addresses the need for a method and apparatus which provide a cluster of nodes with a more cost effective implementation of a quorum resource current shared SCSI storage device implementations. In accordance with one embodiment of the present invention, there is a provided computer system operable to provide nodes of a cluster with a quorum resource. The computer system includes a network interface controller, a mass storage device, a processor, and memory. The network interface controller is operable to send messages to the nodes via a network and receive messages from the nodes via the network. The mass storage device includes storage that is used to implement the quorum resource and that is accessible by the nodes via the network interface controller. The processor is operably coupled to the network interface controller and the mass storage device. The memory is operably coupled to the processor and includes instructions, which when executed by the processor, cause the processor to process a first message requesting ownership of the quorum resource that is received from a first node of the cluster via the network interface controller. Furthermore, the instructions cause the processor to determine whether the first node already owns the quorum resource in response to receiving the first message. Moreover, the instructions cause the processor to determine whether a second message requesting ownership of the quorum resource is received from a second node of the cluster within a predetermined time period of receiving the first message if the first node does not already own the quorum resource. The instructions cause the processor to grant ownership of the quorum resource to the first node if the second message is not received within the predetermined time period.

Pursuant to another embodiment of the present invention, there is provided a high availability system. The high availability system includes a cluster having a plurality of nodes coupled to a network, and a quorum arbitrator having a quorum resource. The quorum arbitrator is operably coupled to said plurality of nodes via said network. Moreover, said quorum arbitrator is operable to receive a first message requesting ownership of said quorum resource from a first node of said plurality of nodes, and determine whether said first node already owns said quorum resource in response to receiving said first message. The quorum arbitrator is further operable to determine whether a second message requesting ownership of said quorum resource is received from a second node of said plurality of nodes within a predetermined time period of receiving said first message if said first node does not already own said quorum resource. Furthermore, quorum arbitrator is operable to grant ownership of said quorum resource to said first node of said plurality of nodes if said second message is not received within said predetermined time period.

Pursuant to yet another embodiment of the present invention, there is provided a computer readable medium for configuring a computer system having a network interface controller, at least one processor, and a mass storage device to implement a quorum arbitrator having a quorum resource. The computer readable medium includes instructions, which when executed by said computer system, cause said computer system to receive a first message requesting ownership of said quorum resource from a first node of a plurality of nodes via said network interface controller. Moreover, the instructions cause the computer system to determine whether said first node already owns said quorum resource in response to receiving said first message. The instructions also cause the computer system to determine whether a second message requesting ownership of said quorum resource is received from a second node of said plurality of nodes within a predetermined time period of receiving said first message if said first node does not already own said quorum resource. Moreover, the instructions cause the computer system to grant ownership of said quorum resource to said first node of said plurality of nodes if said second message is not received within said predetermined time period.

It is an object of the present invention to provide a new high availability system.

It is an object of the present invention to provide an improved high availability system.

It is yet another object of the present invention to provide an inexpensive quorum resource for a high availability system.

It is still another object of the present invention to provide a quorum arbitrator and quorum resource which may be implemented with a properly programmed conventional computer system.

The above and other objects, features, and advantages of the present invention will become apparent from the following description and the attached drawings.

DETAILED DESCRIPTION OF AN EXEMPLARY EMBODIMENT

While the invention is susceptible to various modifications and alternative forms, specific embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 1:
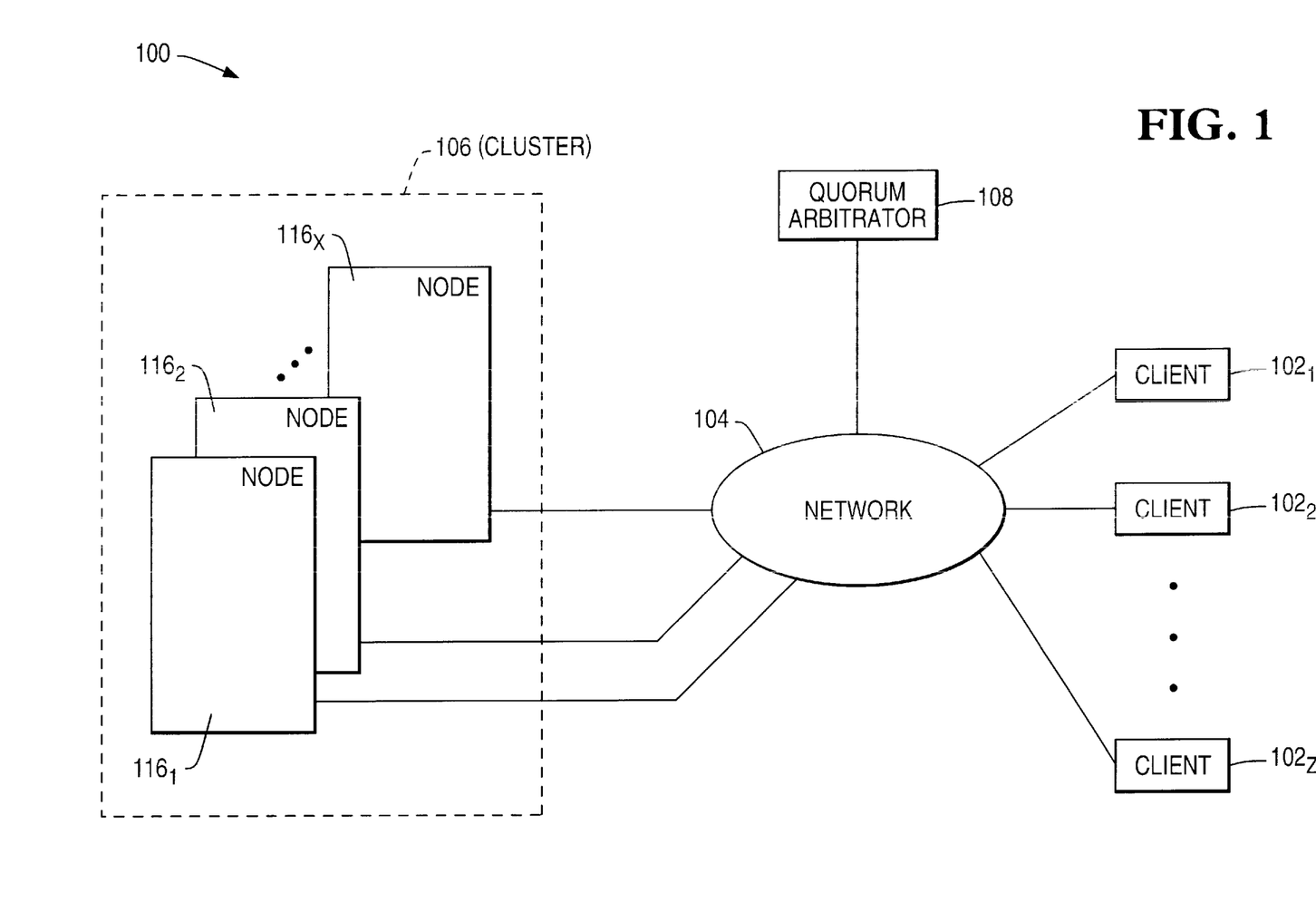
FIG. 1 shows a block diagram of a high availability system in which features of the present invention are incorporated.

FIG. 1 illustrates an exemplary high availability system 100 which incorporates various features of the present invention therein. As depicted in FIG. 1, the high availability system 100 includes clients $102_1$, $102_2$, . . . $102_z$, a network 104, a cluster 106, and a quorum arbitrator 108. The clients $102_1$, $102_2$, . . . $102_z$ are generally operable to communicate with the cluster 106 via the network 104, and access services provided by the cluster 106 via the network 104. To this end, the clients $102_1$, $102_2$, . . . $102_z$ each include conventional computer hardware (e.g. a processor, memory, mouse, keyboard) that in combination execute client software (e.g. e-mail clients, web browsers, file managers) that provide interfaces to services of the cluster 106.

The network 104 is generally operable to provide a communications link between the clients $102_1$, $102_2$, . . . $102_z$ and the cluster 106. Moreover, the network 104 is generally operable to provide a communications link between the cluster 106 and the quorum arbitrator 104. It should be appreciated by those skilled in the art that the network 104 may be implemented with various LAN and WAN technologies including various types of medium (e.g. wireless, coaxial cable, twisted wire pairs, fiber optics, switches, routers) and networking protocols (e.g. Ethernet, NETBUI, TCP/IP, ATM).

The cluster 106 of the exemplary high availability system 100 includes multiple servers or nodes 116 that are operable to provide services to the clients 102. The nodes $116_1$, $116_2$, . . . $116_x$ are coupled to the to one another (e.g. via network 104) in order to communicate with one another. Furthermore, the nodes $116_1$, $116_2$, . . . $116_x$ are coupled to the network 104 in order to provide services to the clients $102_1$, $102_2$, . . . $102_z$. For example, the nodes $116_1$, $116_2$, . . . $116_x$ may provide any number of services such as printer services, application server services, file server services, database services, e-mail services, proxy services, web server services, name resolution services (e.g. DNS, WINS), ftp services, news services, gateway services, and telnet services to name a few.

In an exemplary embodiment, each node $116_1$, $116_2$, . . . $116_x$ is implemented with conventional server hardware such as processors, mass storage device, and network interface cards. Moreover, each node $116_1$, $116_2$, . . . $116_x$ executes cluster management software and operating system software in order to provide services to the clients $102_1$, $102_2$, . . . $102_z$. In general, execution of the cluster management software configures the nodes $116_1$, $116_2$, . . . $116_x$ and therefore the cluster 106 to function as a single server from the point of view of the clients $102_1$, $102_2$, . . . $102_z$. Moreover, execution of the cluster management software configures the nodes $116_1$, $116_2$, . . . $116_x$ and therefore the cluster server 106 to implement a cluster manager.

The cluster manager provides a system administrator with an interface for defining services executed by the nodes $116_1$, $116_2$, . . . $116_x$ of the server cluster 106. More particularly, the cluster manager allows a system administrator to designate which services are executed on which nodes $116_1$, $116_2$, . . . $116_x$ of the server cluster 106, the resources required for each provided service, and actions to take in case one of the nodes 116 of the cluster 106 becomes unavailable. Moreover, the cluster manager causes the nodes $116_1$, $116_2$,. $116_x$ of the server cluster 106 to provide the services in the manner designated by the system administrator, and carry out the designated actions in case one of the nodes $116_1$, $116_2$, . . . $116_x$ becomes unavailable or other criteria are satisfied.

The quorum arbitrator 108 is generally operable to provide the nodes $116_1$, $116_2$, $116_x$ with a quorum resource. More specifically, the quorum arbitrator 108 is operable to offer the nodes $116_1$, $116_2$,. . . $116_x$ of the cluster 106 a quorum resource which provides physical storage for cluster files associated with the state of the cluster 106. Moreover, the quorum arbitrator is operable to provide persistent arbitration to the quorum resource and cluster files stored thereon. In other words, the quorum arbitrator 108 is operable to receive multiple ownership requests from the nodes $116_1$, $116_2$, . . . $116_x$ of the cluster 106, grant ownership of the quorum resource to a single node 116 of the cluster 106, and defend the granted ownership of the quorum resource from ownership requests received from the other nodes of the cluster 106.

Figure 2:
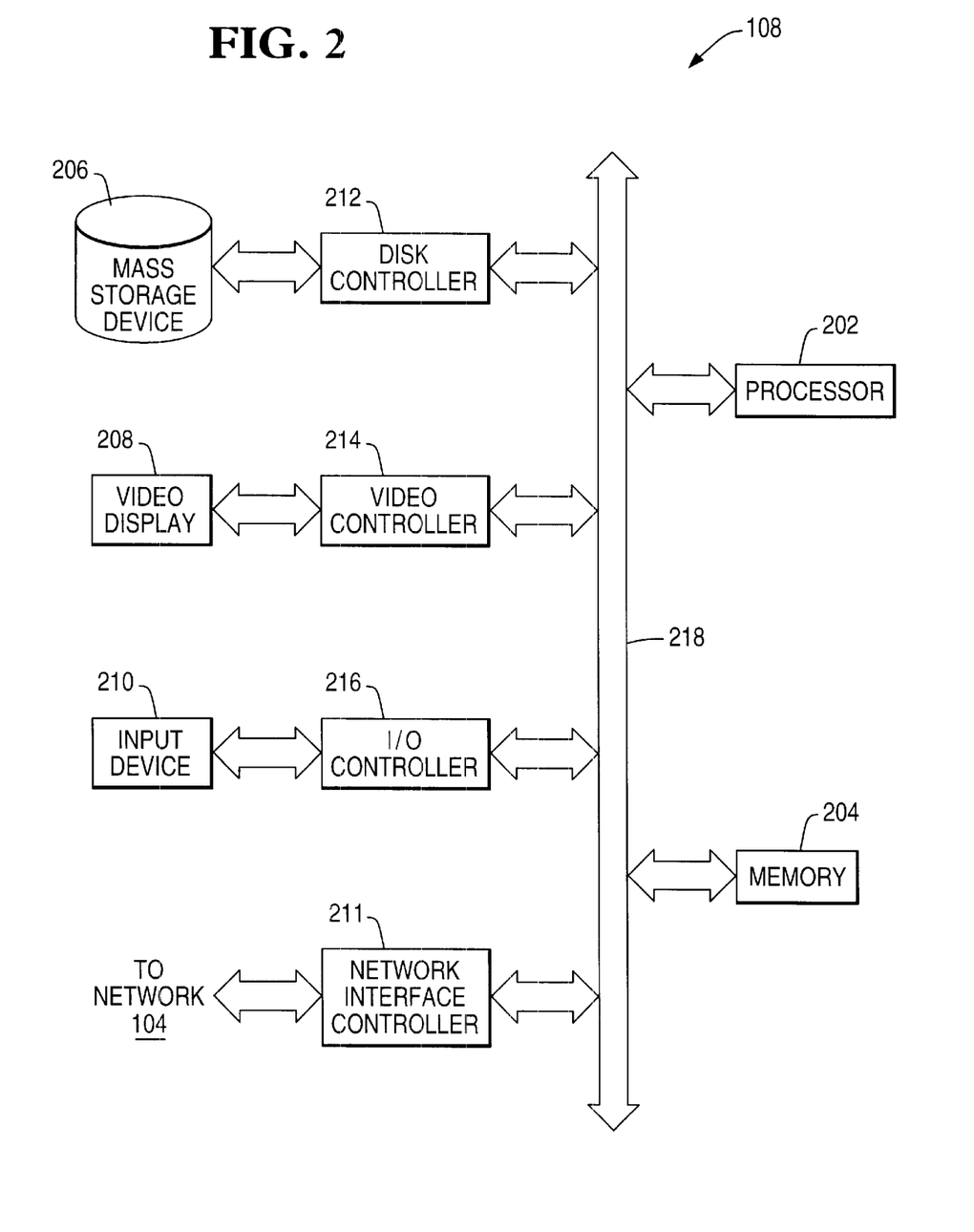
FIG. 2 shows a block diagram of the exemplary quorum arbitrator of FIG. 1.

As depicted in FIG. 2, an exemplary quorum arbitrator 108 includes a processor 202, memory 204, a mass storage device 206, a video display 208, and input device(s) 210. Moreover, the quorum arbitrator 108 includes a mass storage controller 212 for controlling the mass storage device 206, a video controller 214 for controlling the video display 208, an I/O controller(s) 216 for controlling the input device(s) 210. Furthermore, the quorum arbitrator 108 includes a network interface controller 217 for providing the processor 202 with an interface to the network 104 and a system bus 218 which operably couples the processor 202 to the memory 204, the mass storage controller 212, the video controller 214, the I/O controller 216, and the network interface controller 217.

The mass storage device 206 is generally operable to provide a quorum resource used to store in a persistent manner cluster files used by the nodes $116_1$, $116_2$, . . . $116_x$ of the cluster 106 to maintain cluster unity and data integrity. In an exemplary embodiment, the mass storage device 206 is operable to store to a NTFS partition of a SCSI disk drive a cluster database that includes recovery logs, cluster state data, and a cluster identifier resource ClusName used by the nodes $116_1$, $116_2$, ... $116_x$ to maintain cluster unity and data integrity. The cluster identifier resource ClusName provides a mechanism by which other systems on the network 104 (e.g. clients 102, quorum arbitrator 108, and nodes 116) can communicate with the cluster 106. It should be appreciated that the mass storage device 206 may be implemented using various writable storage devices (e.g. IDE hard disks, SCSI hard disks, re-writable CD-ROM drives, digital audio tape drives, optical drives, and RAID devices) and various file systems (e.g. NTFS, EXT2, FAT32, and XFS).

The memory 204 includes random access memory (RAM) such as SRAM (static RAM), DRAM (dynamic RAM), and SDRAM (synchronous DRAM) which store software routines obtained from computer readable medium such as a floppy disk, CD-ROM disc, DVD disc, and hard disks. The memory 1104 may also include nonvolatile computer readable medium such as PROM (programmable read only memory), EPROM (electrically PROM), EEPROM (electrically erasable PROM), and flash memory that store firmware routines. In particular, the memory 204 stores software and/or firmware routines which, when executed by the processor 202, cause the processor 202 to arbitrate amongst ownership requests received from nodes $116_1$, $116_2$, ... $116_x$ of the cluster 106, grant ownership of the quorum resource to a single node 116 of the cluster 106, a defend the granted ownership to the single node 116 of the cluster 106.

The processor 202 is operable to execute software routines stored in the memory 204, and communicate with the mass storage device 206, the video display 208, the input device 210, and the network 104 via the mass storage controller 212, the video controller 214, the I/O controller 216, and the network interface controller 217, respectively. Most importantly, the processor 202 is operable to execute software routines of the memory 204 which cause the processor 202 to arbitrate amongst ownership requests received from nodes $116_1$, $116_2$, ... $116_x$ of the cluster 106, grant ownership of the quorum resource to a single node 116 of the cluster 106, a defend the granted ownership to the single node 116 of the cluster 106.

Figure 3:
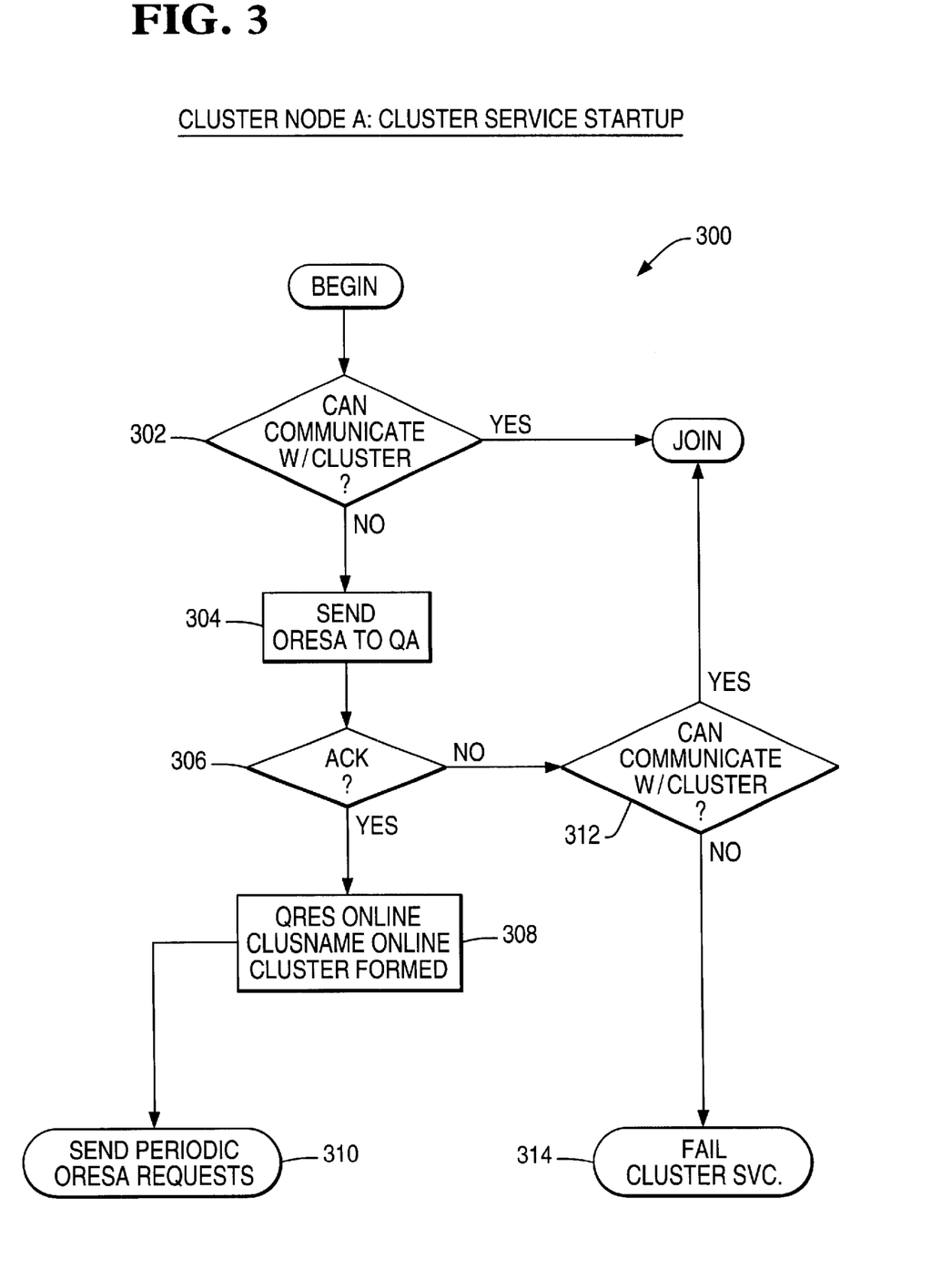
FIG. 3 shows flowchart that illustrates an exemplary startup operation implemented by the nodes shown in FIG. 1.
Figure 5:
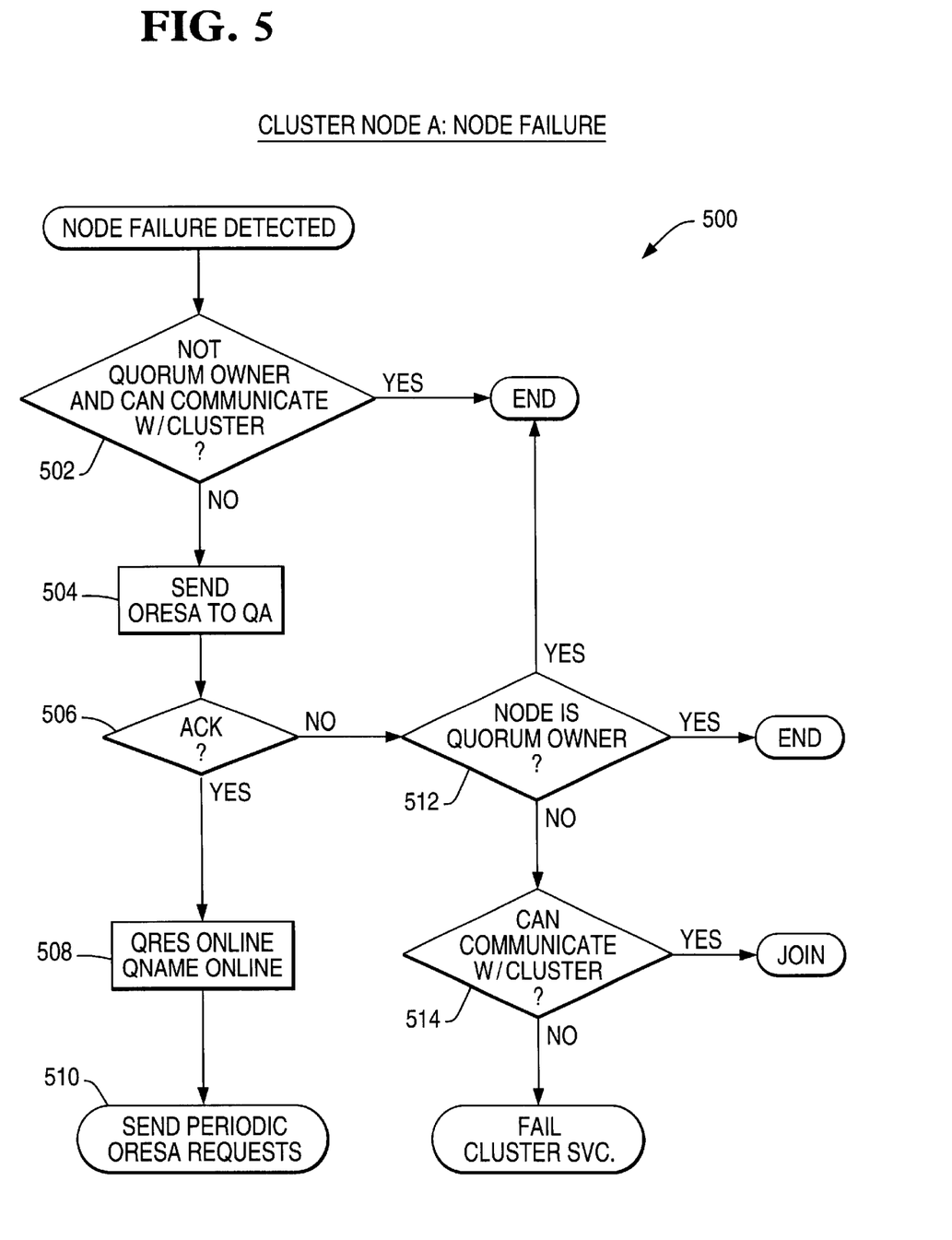
FIG. 5 shows a flowchart that illustrates an exemplary node failure operation implemented by the nodes shown in FIG. 1.
Figure 6:
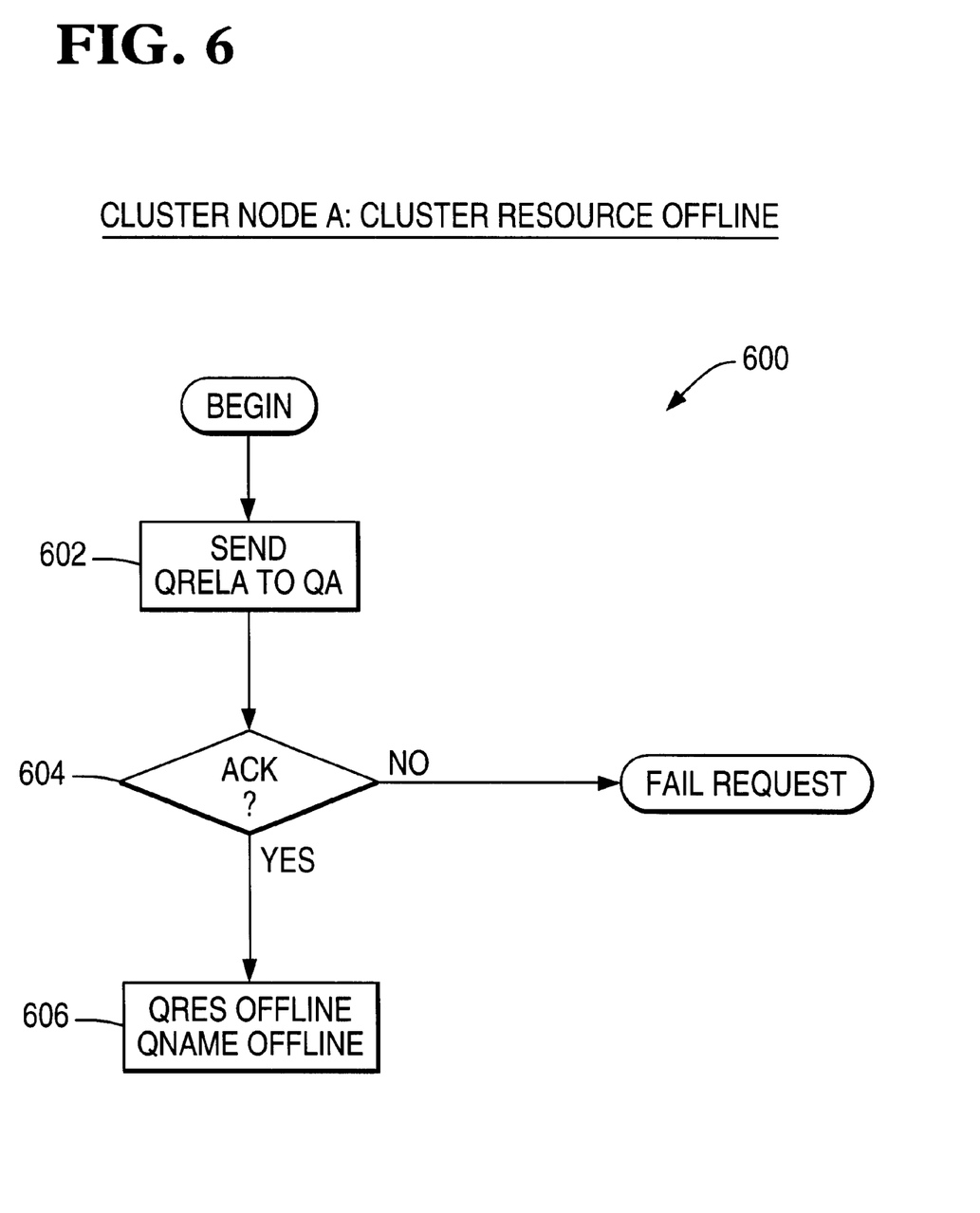
FIG. 6 shows a flowchart that illustrates an exemplary quorum resource offline operation implemented by the nodes shown in FIG. 1.
Figure 7:
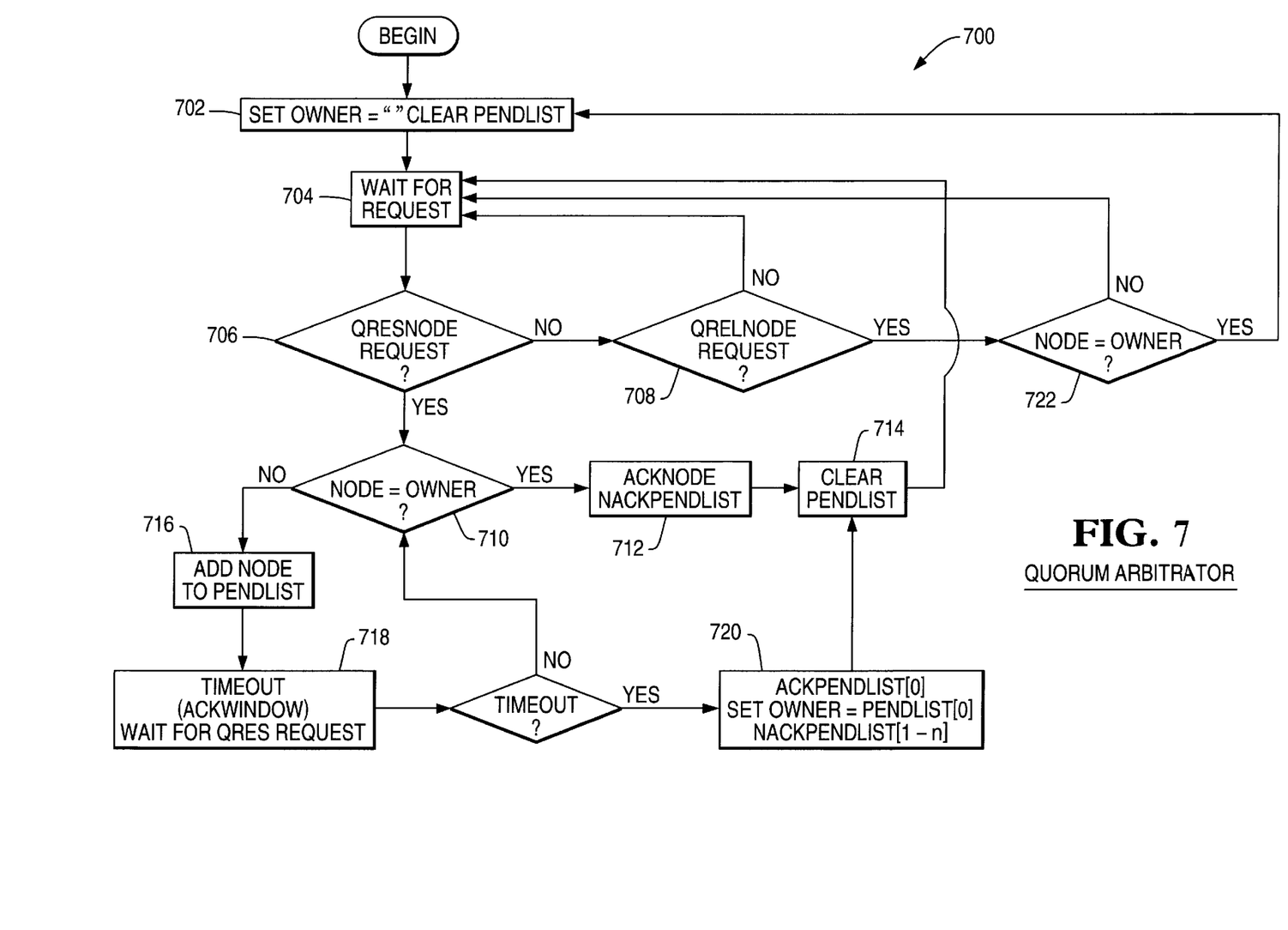
FIG. 7 shows a flowchart that illustrates an exemplary quorum arbitration operation implemented by the quorum arbitrator shown in FIG. 1.

Reference is now made to FIGS. 3–7 which illustrate the operation of the quorum arbitrator 108 and the nodes $116_1$, $116_2$, ... $116_x$. More specifically, FIGS. 3–6 illustrate how the nodes $116_1$, $116_2$, ... $116_x$ utilize the quorum arbitrator 108 in order to maintain cluster unity and data integrity and FIG. 7 illustrates the manner by which the quorum arbitrator 108 processes requests received from the nodes $116_1$, $116_2$, ... $116_x$ of the cluster 106. Referring now to FIG. 3, a flowchart is illustrated which depicts a startup operation 300 implemented by each node $116_1$, $116_2$, ... $116_x$ of the cluster 106. In general each node $116_1$, $116_2$, ... $116_x$ of the cluster 106 executes the startup operation 300 at system startup such as when the node is first powered up. The startup operation 300 along with will be described from the viewpoint of node A (e.g. $116_1$) in order to help simply the startup operation of the nodes $116_1$, $116_2$, ... $116_x$.

In step 302, the node A determines whether node A can successfully communicate with the cluster identified by the cluster identifier resource ClusName. If the node 11 61 is able to communicate with the cluster 106 via the cluster identifier resource ClusName, then the node simply joins the cluster 106 since the cluster 106 is already in existence. The manner by which the nodes $116_1$, $116_2$, ... $116_x$ join an existing cluster is described in detail below with reference to FIG. 4. However, if the node $116_1$, is unable to communicate with the cluster 106 via the cluster 106 identifier resource ClusName, then the node 116, assumes that the cluster 106 has yet to be formed and proceeds to step 304 to attempt to form the cluster 106.

In order to form the cluster 106, node A must obtain ownership of the quorum resource of the quorum arbitrator 108. To this end, the node 116, in step 304 sends a quorum reserve request QRESA to the quorum arbitrator 108 which identifies node A as the originator of the request. Then, node A in step 306 checks the message returned by the quorum arbitrator 108. If the returned message is an acknowledgment message ACK, then node A successfully obtained ownership of the quorum resource QRes. Accordingly, node A in step 308 forms the cluster 106 by bringing the quorum resource QRes for the cluster 106 and the cluster identifier resource ClusName for the cluster 106 online. Moreover, as a result of bringing the quorum resource QRes and the cluster identifier resource ClusName online, node A enters a "Quorum Owner" mode in which node A sends periodic quorum reserve requests QRESA to the quorum arbitrator 108 in step 310. As will be explained in conjunction with FIG. 7, the quorum arbitrator 108 maintains node A's ownership of the quorum resource based upon whether the quorum arbitrator 108 continues to periodically receive quorum reserve requests QRESA from node A.

If node A determines in step 306 that the returned message is not an acknowledgment message ACK, then node A failed to obtain ownership of the quorum resource QRes in step 304. Accordingly, node A in step 312 attempts to communicate with the cluster 106 via the cluster identifier resource ClusName for the cluster 106 in order to determine whether another node (e.g. $116_2$) obtained ownership of the quorum resource QRes and formed the cluster 106. If node A in step 312 successful communicates with the cluster 106 via the cluster identifier resource ClusName, then node A joins the cluster 106. (See, FIG. 4.)

However, if node A in step 312 was unsuccessful in communicating with the cluster 106, then node A fails the Cluster Service on node A in step 314. As result, node A is not part of the cluster 106. Moreover, in order to join the cluster 106, node A must restart the Cluster Service and re-execute the startup operation 300.

Figure 4:
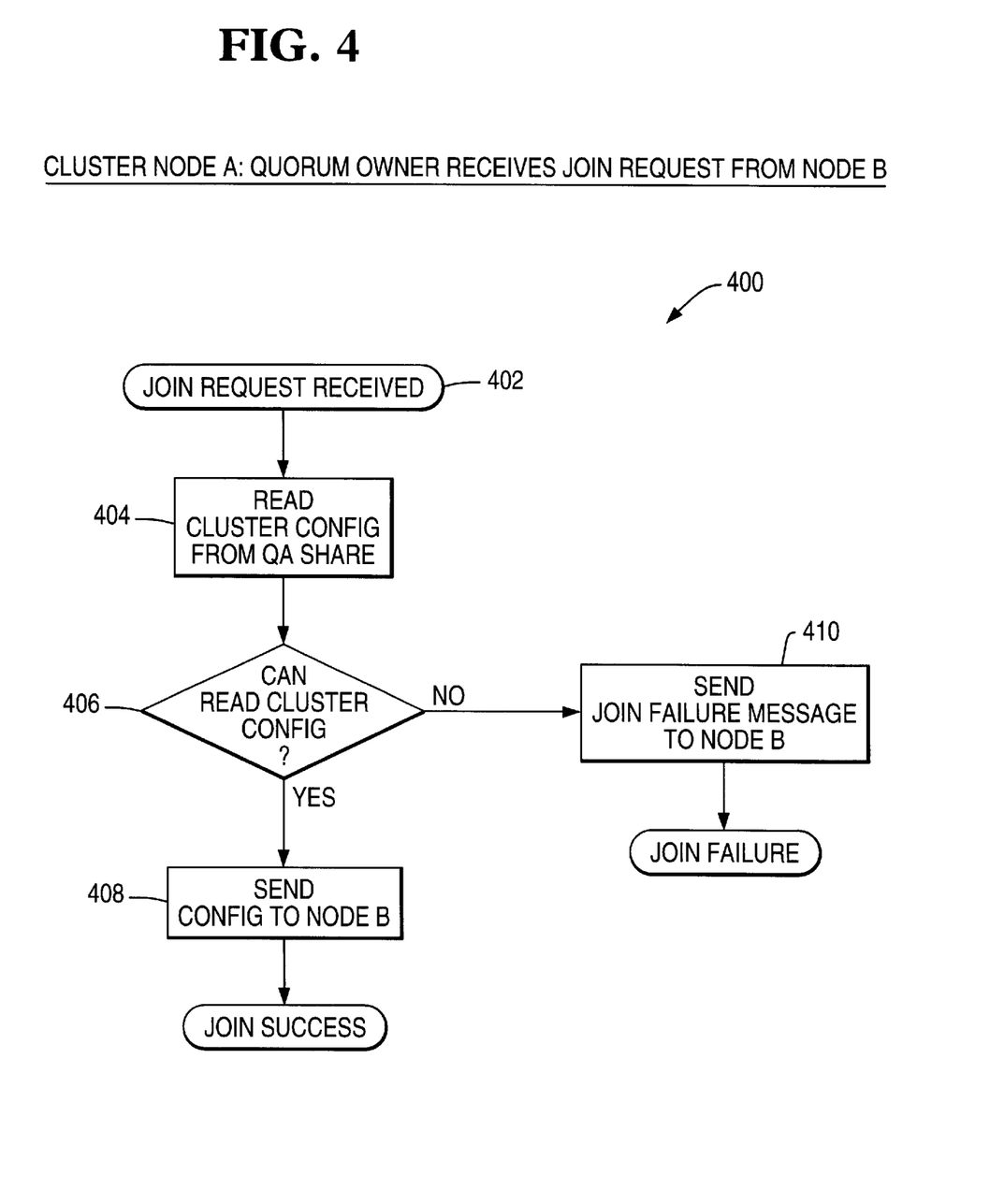
FIG. 4 shows a flowchart that illustrates an exemplary join operation implemented by the nodes shown in FIG. 1.

Shown in FIG. 4 is a flowchart of a join operation 400 that illustrates the manner by which a node joins an existing cluster 106. In order to simplify the description of the join operation of the nodes $116_1$, $116_2$, ... $116_x$, the join operation 400 will be described from the viewpoint of node B (e.g. node $116_2$) requesting to join a cluster 106 formed by node A (e.g. node $116_1$) which has ownership of the quorum resource QRes. In particular, node A in step 402 of the join operation 400 receives a join request $JReq_B$ from node B that indicates node B desires to join the cluster 106 formed by node A.

In response to receiving the join request $JReq_B$ from node B, node A determines whether node A can successfully read the Cluster Files stored on the quorum resource QRes of the cluster 106. To this end, node A attempts in step 404 to read the Cluster Files from the quorum resource QRes of the quorum arbitrator 108. If node A determines that node A successfully read the Cluster Files from the quorum arbitrator 108 in step 406, then node A sends the read cluster configuration information to node B in step 408. As a result of sending the read cluster configuration information to node B, node B is successfully added to the cluster 106.

If, however, node A determines in step 406 that node A is unsuccessful in reading the Cluster Files from the quorum arbitrator 108, then node A sends a "Join Failure" message to node B during step 410. As a result of sending the "Join Failure" message to node B, node B is denied from joining the cluster 106 formed by node A. In this manner, the join operation helps maintain data integrity by not allowing a node (e.g. node B) to join a cluster unless the Quorum Owner (e.g. node A) is able to communicate with the quorum arbitrator 108.

In an exemplary embodiment, the cluster 106 is permitted to operate in a "Degraded State" even if the quorum arbitrator 108 is down or the Quorum Owner (e.g. node A) is unable to communicate with the quorum arbitrator 108. In the degraded state, all nodes that are currently participating in the cluster continue to run the cluster service, but the state of the cluster (i.e. which nodes control which resources, what nodes are in the cluster, what resources are being protected in the cluster) cannot be changed during the degraded state in order to maintain data integrity. In particular, new resources cannot be created for the cluster during the degraded state, new nodes cannot be added to the cluster during the degraded state, and resources cannot be moved from one node of the cluster to another during the degraded state.

A flowchart of a node failure operation 500 that illustrates the manner by which a node processes a detected node failure is illustrated in FIG. 5. In order to simplify the description of the failure operation 500 of the nodes $116_1$, $116_2$, . . . $116_x$, the node failure operation 500 will be described from the viewpoint of node A detecting a failure of another node of the cluster 106. In an exemplary embodiment, node A detects a failure of another node of the cluster 106 based upon heartbeat signals or messages transmitted by each node of the cluster. Upon detecting loss of a heartbeat signal from one of the clusters, node A in step 502 determines whether node A is still able to communicate with the owner of the quorum resource QRes and is not the owner of the quorum resource QRes. If node A determines that it is not the Quorum Owner and is still operable to communicate with the Quorum Owner, then node A stops processing the detected node failure and remains a part of the cluster 106.

However, if node A determines in step 502 that it is the Quorum Owner or is not able to communicate with the Quorum Owner, then node A attempts to gain ownership of the quorum resource QRes. To this end, node A in step 504 sends a quorum reserve request QRESA to the quorum arbitrator 108 that identifies itself as the originator of the request and waits for a reply message from the quorum arbitrator 108. If node A determines in step 506 that the reply message from the quorum arbitrator 108 is an acknowledgment message ACK, then node A successfully obtained ownership of the quorum resource QRes. Accordingly, node A in step 508 forms the cluster 106 by bringing the quorum resource QRes for the cluster 106 and the cluster identifier resource ClusName for the cluster 106 online. Moreover, as a result of bringing the quorum resource QRes and the cluster identifier resource ClusName online, node A in step 510 enters a "Quorum Owner" mode in which node A sends periodic quorum reserve requests QRESA to the quorum arbitrator 108 in step 310.

However, if node A determines in step 506 that the reply message from the quorum arbitrator 108 is not an acknowledgment message ACK, then node A in step 512 determines whether node A is the current owner of the quorum resource QRes for the cluster 106. If node A determines in step 512 that it is the current Quorum Owner, then node A ceases further processing of the detected node failure and remains the Quorum Owner.

If node A in step 512 determines that it is not the current Quorum Owner, then node A determines in step 514 whether it can communicate with the cluster via the cluster identifier resource ClusName. If node A successfully communicates with cluster 106 in step 514, then node A joins the existing cluster. However, if node A is unsuccessful in communicating with the cluster 106, then node A terminates the Cluster Service on node A thus removing node A from the cluster 106.

Referring now to FIG. 6, there is shown a flowchart of a quorum resource offline operation 600 that illustrates the manner by which the node which owns the quorum resource QRes takes the quorum resource QRes offline. In order to simplify the description of the quorum resource offline operation 600 of the nodes $116_1$, $116_2$, $116_x$, the quorum resource offline operation 600 will be described from the viewpoint of node A taking the quorum resource QRes offline. It should be appreciated that the quorum resource offline operation 600 enables a user to manually move the resource to another node for various reasons such as in preparation of shutting down the current Quorum Owner for maintenance.

To this end, node A in step 602 sends a quorum release request $QREL_A$ to the quorum arbitrator 108 that identifies node A as the originator of the request and waits for a reply message from the quorum arbitrator 108. If node A determines in step 604 that the reply message from the quorum arbitrator 108 is not an acknowledgment message ACK, then the node A remains the owner of the quorum resource QRes for the cluster 106. However, if node A determines that the reply message from the quorum arbitrator is an acknowledgment message, then node A proceeds to step 606. In step 606, node A takes the quorum resource QRes offline and the cluster identifier resource ClusName offline thereby enabling another node of the cluster 106 to become the Quorum Owner.

Referring now to FIG. 7, there is shown a flowchart of a quorum arbitration operation 700 that illustrates the manner by which the quorum arbitrator 108 arbitrates requests for ownership of the quorum resource QRes. In an exemplary embodiment, the quorum arbitration operation 700 is implemented by a Quorum Arbitration service which is preferably automatically run when the quorum arbitrator 108 is booted up. Once the Quorum Arbitration service is started on the quorum arbitrator 108, the quorum arbitrator in step 702 initializes an ownership identifier Owner used to identify the current owner of the quorum resource QRes and a pending list PendList used to identify nodes $116_1$, $116_2$, . . . $116_x$ of the cluster 106 which have pending quorum reserve requests $QRES_{node}$. More specifically, in an exemplary embodiment, the quorum arbitrator 108 initializes an internal variable for the ownership identifier Owner to an empty string (""). Moreover, the quorum arbitrator 108 maintains an internal list of strings for the pending list PendList which the quorum arbitrator 108 clears during step 702.

After initializing the ownership identifier Owner and the pending list PendList, the quorum arbitrator in step 704 waits for an incoming requests from the nodes $116_1$, $116_2$, . . . $116_x$ of the cluster 106. When a request is received, the quorum resource 108 in step 706 determines whether the received request is a quorum reserve request $QRES_{node}$. If the quorum resource 108 determines in step 706 that the request is not a quorum reserve request $QRES_{node}$, then the quorum resource 108 in step 708 determines whether the request is a quorum release request $QREL_{node}$. If the quorum resource 108 in step 708 determines that the request is also not a quorum release request $QREL_{node}$, then the quorum resource 108 returns to step 704 in order to receive another request from the nodes $116_1, 116_2, \ldots 116_x$.

If the quorum arbitrator 108 determines in step 706 that the received request is a quorum reserve request $QRES_{node}$, then the quorum arbitrator 108 determines in step 710 whether the node that originated the quorum reserve request $QRES_{node}$ is the same node as the node identified by the current owner identifier Owner. If quorum arbitrator 108 determines in step 708 that the originator of the quorum reserve request $QRES_{node}$ is the same node identified by the current owner identifier Owner, then the quorum arbitrator in step 712 sends the originator of the quorum reserve request $QRES_{node}$ an acknowledgement message ACK and sends the originators of any pending requests of the pending list PendList a negative acknowledgment message NACK. After sending the negative acknowledgment messages to the nodes which originated of the pending requests of the pending list PendList, the quorum arbitrator 108 in step 714 clears the pending list PendList and returns to step 704 in order to receive further messages from the nodes $116_1, 116_2, \ldots 116_x$.

If the quorum arbitrator 108 determines in step 710 that the originator of the quorum reserve request $QRES_{node}$ is not the same node identified by the current owner identifier Owner, then the quorum arbitrator 108 in step 716 adds a node identifier to the pending list PendList which identifies the node from which the quorum reserve request $QRES_{node}$ originated. The quorum arbitrator 108 then in step 718 sets a timer to an "Arbitration Window" value which is the max amount of time for a node to recognize a missing heartbeat signal.

Once the timer is set, the quorum arbitrator 108 in step 718 further waits for either another incoming quorum reserve request $QRES_{node}$ request or for the timer to expire. If the quorum arbitrator 108 receives another quorum reserve request $QRES_{node}$ request before the time expires, then the quorum arbitrator returns to step 708 in order to determine whether the originator of the request is the current owner of the quorum resource QRes. However, if the timer expires before receiving another request, then the quorum arbitrator 108 in step 720 sends an acknowledgment message ACK to the first node identified in the pending list PendList, sets current owner identifier Owner to the first node identified in the pending list PendList, sends a negative acknowledgment messages NACK to all other nodes identified in the pending list PendList After sending the nodes $116_1, 116_2, \ldots 116_x$ an appropriate message, the quorum arbitrator returns to step 714 in order to clear the pending list PendList and wait for further messages from the nodes $116_1, 116_2, \ldots 116_x$.

If quorum arbitrator 108 determines in step 708 that the received request is a quorum release request $QREL_{node}$, the quorum arbitrator 108 determines in step 722 whether the originator of the received quorum release request $QREL_{node}$ is the same node as the node identified by the current owner identifier Owner. If the quorum arbitrator 108 in step 722 determines that the originator of Athe request is not the current owner of the quorum resource QRes, then the quorum arbitrator returns to step 704 to wait for further messages from the nodes $116_1, 116_2, \ldots 116_x$. However, if the quorum arbitrator 108 in step 722 determines that the originator of the request is the current owner of the quorum resource QRes, then the quorum arbitrator 108 returns to step 702 in order to reinitialize the current owner identifier Owner and the pending list PendList It should be appreciated from the above description of operation of the quorum arbitrator 108 and the exemplary hardware depicted in FIG. 2 that the quorum arbitrator 108 may be implemented with a relatively inexpensive general purpose computer system or server which has been properly programmed. Accordingly, the quorum arbitrator 108 provides a mechanism for implementing a quorum resource without the added expense and limitations associated with a shared SCSI storage device.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected. For example, while the Quorum Arbitration service has been described as being implemented on a single quorum arbitrator, it should be appreciated by those skilled in the art that the Quorum Arbitration service could be implemented by a cluster of quorum arbitrators.

What is claimed is:

1. A computer system operable to provide a plurality of nodes of a cluster with a quorum resource, comprising:

a network interface controller operable to send messages to said plurality nodes via a network and receive messages from said plurality of nodes via said network;

a mass storage device comprising storage that is used to implement said quorum resource and that is accessible by said plurality of nodes via said network interface controller;

a processor operably coupled to said network interface controller and said mass storage device; and memory operably coupled to said processor and comprising a plurality of instructions, which when executed by said processor, causes said processor to:

a) receive a first message requesting ownership of said quorum resource from a first node of said plurality of nodes via said network interface controller, b) determine whether said first node already owns said quorum resource in response to receiving said first message, c) determine whether a second message requesting ownership of said quorum resource is received from a second node of said plurality of nodes within a predetermined time period of receiving said first message if said first node does not already own said quorum resource, and d) grant ownership of said quorum resource to said first node of said plurality of nodes if said second message is not received within said predetermined time period.

2. The computer system of claim 1, wherein said plurality of instructions of said memory, further cause said processor to:

add said first message to a pending list of received messages in response to receiving said first message if said first node does not already own said quorum resource, and grant ownership of said quorum resource to said first node if said second message is not received within said predetermined time period and said pending list indicates said first node is to be granted ownership of said quorum resource.

3. The computer system of claim 1, wherein said plurality of instructions of said memory, further cause said processor to:

add said first message to a pending list of received messages in response to receiving said first message if said first node does not already own said quorum resource, grant ownership of said quorum resource to said first node if said second message is not received within said predetermined time period and said pending list indicates said first node is to be granted ownership of said quorum resource, and clear said pending list upon granting ownership of said quorum resource to said first node.

4. The computer system of claim 1, wherein said plurality of instructions of said memory, further cause said processor to:

grant ownership of said quorum resource to said second node of said plurality of nodes if said second message is received within said predetermined time period and said second node already owns said quorum resource.

5. The computer system of claim 1, wherein said plurality of instructions of said memory, further cause said processor to:

add said first message to a pending list of received messages in response to receiving said first message if said first node does not already own said quorum resource, grant ownership of said quorum resource to said second node of said plurality of nodes if said second message is received within said predetermined time period and said second node already owns said quorum resource, and clear said pending list upon granting ownership of said quorum resource to said second node.

6. The computer system of claim 1, wherein said plurality of instructions of said memory, further cause said processor to:

add said first message to a pending list of received messages in response to receiving said first message if said first node does not already own said quorum resource, and add said second message requesting ownership of said quorum resource received from said second node within said predetermined time period if said second node does not already own said quorum resource, determine whether a third message requesting ownership of said quorum resource is received from a third node of said plurality of nodes within said predetermined time period of receiving said second message, grant ownership of said quorum resource to said first node if said third message is not received within said predetermined time period and said pending list indicates said first node is to be granted ownership of said quorum resource, and send each node identified by said pending list except for said first node a fourth message which indicates said each node has been ownership of the quorum resource.

7. A high availability system, comprising:

a cluster comprising a plurality of nodes coupled to a network; and a quorum arbitrator comprising a quorum resource and operably coupled to said plurality of nodes via said network, said quorum aribtrator operable to (i) receive a first message requesting ownership of said quorum resource from a first node of said plurality of nodes, (ii) determine whether said first node already owns said quorum resource in response to receiving said first message, (iii) determine whether a second message requesting ownership of said quorum resource is received from a second node of said plurality of nodes within a predetermined time period of receiving said first message if said first node does not already own said quorum resource, (iv) grant ownership of said quorum resource to said first node of said plurality of nodes if said second message is not received within said predetermined time period.

8. The high availability system of claim 7, wherein said quorum arbitrator is further operable to:

add said first message to a pending list of received messages in response to receiving said first message if said first node does not already own said quorum resource, and grant ownership of said quorum resource to said first node if said second message is not received within said predetermined time period and said pending list indicates said first node is to be granted ownership of said quorum resource.

9. The high availability system of claim 7, wherein said quorum arbitrator is further operable to:

add said first message to a pending list of received messages in response to receiving said first message if said first node does not already own said quorum resource, grant ownership of said quorum resource to said first node if said second message is not received within said predetermined time period and said pending list indicates said first node is to be granted ownership of said quorum resource, and clear said pending list upon granting ownership of said quorum resource to said first node.

10. The high availability system of claim 7, wherein said quorum arbitrator is further operable to:

grant ownership of said quorum resource to said second node of said plurality of nodes if said second message is received within said predetermined time period and said second node already owns said quorum resource.

11. The high availability system of claim 7, wherein said quorum arbitrator is further operable to:

add said first message to a pending list of received messages in response to receiving said first message if said first node does not already own said quorum resource, grant ownership of said quorum resource to said second node of said plurality of nodes if said second message is received within said predetermined time period and said second node already owns said quorum resource, and clear said pending list upon granting ownership of said quorum resource to said second node.

12. The high availability system of claim 7, wherein said quorum arbitrator is further operable to:

add said first message to a pending list of received messages in response to receiving said first message if said first node does not already own said quorum resource, and add said second message requesting ownership of said quorum resource received from said second node within said predetermined time period if said second node does not already own said quorum resource, determine whether a third message requesting ownership of said quorum resource is received from a third node of said plurality of nodes within said predetermined time period of receiving said second message, grant ownership of said quorum resource to said first node if said third message is not received within said predetermined time period and said pending list indicates said first node is to be granted ownership of said quorum resource, and send each node identified by said pending list except for said first node a fourth message which indicates said each node has been ownership of the quorum resource.

13. A computer readable medium for configuring a computer system comprising a network interface controller, at least one processor, and a mass storage device to implement a quorum arbitrator comprising a quorum resource, said computer readable medium comprising a plurality of instructions, which when executed by said computer system, cause said computer system to:

receive a first message requesting ownership of said quorum resource from a first node of a plurality of nodes via said network interface controller, determine whether said first node already owns said quorum resource in response to receiving said first message, determine whether a second message requesting ownership of said quorum resource is received from a second node of said plurality of nodes within a predetermined time period of receiving said first message if said first node does not already own said quorum resource, and grant ownership of said quorum resource to said first node of said plurality of nodes if said second message is not received within said predetermined time period.

14. The computer readable medium of claim 13, wherein said plurality of instructions, when executed by said computer system, further cause said computer system to:

add said first message to a pending list of received messages in response to receiving said first message if said first node does not already own said quorum resource, and grant ownership of said quorum resource to said first node if said second message is not received within said predetermined time period and said pending list indicates said first node is to be granted ownership of said quorum resource.

15. The computer readable medium of claim 13, wherein said plurality of instructions, when executed by said computer system, further cause said computer system to:

add said first message to a pending list of received messages in response to receiving said first message if said first node does not already own said quorum resource, grant ownership of said quorum resource to said first node if said second message is not received within said predetermined time period and said pending list indicates said first node is to be granted ownership of said quorum resource, and clear said pending list upon granting ownership of said quorum resource to said first node.

16. The computer readable medium of claim 13, wherein said plurality of instructions, when executed by said computer system, further cause said computer system to:

grant ownership of said quorum resource to said second node of said plurality of nodes if said second message is received within said predetermined time period and said second node already owns said quorum resource.

17. The computer readable medium of claim 13, wherein said plurality of instructions, when executed by said computer system, further cause said computer system to:

add said first message to a pending list of received messages in response to receiving said first message if said first node does not already own said quorum resource, grant ownership of said quorum resource to said second node of said plurality of nodes if said second message is received within said predetermined time period and said second node already owns said quorum resource, and clear said pending list upon granting ownership of said quorum resource to said second node.

18. The computer readable medium of claim 13, wherein said plurality of instructions, when executed by said computer system, further cause said computer system to:

add said first message to a pending list of received messages in response to receiving said first message if said first node does not already own said quorum resource, and add said second message requesting ownership of said quorum resource received from said second node within said predetermined time period if said second node does not already own said quorum resource, determine whether a third message requesting ownership of said quorum resource is received from a third node of said plurality of nodes within said predetermined time period of receiving said second message, grant ownership of said quorum resource to said first node if said third message is not received within said predetermined time period and said pending list indicates said first node is to be granted ownership of said quorum resource, and send each node identified by said pending list except for said first node a fourth message which indicates said each node has been ownership of the quorum resource.

* * * * *